United States Patent
Honnikoppa

(10) Patent No.: US 8,973,248 B2
(45) Date of Patent: Mar. 10, 2015

(54) CONNECTION ASSEMBLY FOR CONNECTING METALLIC AND PLASTIC COMPONENTS AND METHOD OF CONNECTING PLASTIC AND METALLIC COMPONENTS

(71) Applicant: Toyota Motor Engineering & Manufacturing North America, Inc., Erlanger, KY (US)

(72) Inventor: Shashikumar Honnikoppa, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 219 days.

(21) Appl. No.: 13/645,841

(22) Filed: Oct. 5, 2012

(65) Prior Publication Data

US 2014/0096366 A1    Apr. 10, 2014

(51) Int. Cl.

| | |
|---|---|
| *B21J 15/08* | (2006.01) |
| *B29C 65/44* | (2006.01) |
| *F16B 19/04* | (2006.01) |
| *B29C 65/00* | (2006.01) |
| *F01M 11/00* | (2006.01) |
| *F16B 5/04* | (2006.01) |
| *B21K 25/00* | (2006.01) |
| *B21J 15/00* | (2006.01) |
| *B29L 31/00* | (2006.01) |
| *F16B 19/06* | (2006.01) |

(52) U.S. Cl.
CPC ............... *F16B 19/04* (2013.01); *B29C 65/44* (2013.01); *B21J 15/08* (2013.01); *B29C 66/21* (2013.01); *B29C 66/348* (2013.01); *B29C 66/742* (2013.01); *B29C 66/92443* (2013.01); *B29C 66/92921* (2013.01); *F01M 11/0004* (2013.01); *F16B 5/045* (2013.01); *B21K 25/00* (2013.01); *B21J 15/00* (2013.01); *B29C 66/929* (2013.01); *B29L 2031/737* (2013.01); *B29C 66/7422* (2013.01); *F16B 19/06* (2013.01)
USPC ........................ 29/525.07; 264/249; 411/501

(58) Field of Classification Search
USPC ............. 29/525.07, 525.03, 469.5, 505, 428, 29/525.14, 525.15; 411/501, 302, 947; 264/249; 219/603
See application file for complete search history.

(56) References Cited

U.S. PATENT DOCUMENTS

| | | | |
|---|---|---|---|
| 2,477,430 | A * | 7/1949 | Swanstrom ................... 411/302 |
| 5,357,732 | A | 10/1994 | Markle et al. |
| 6,453,892 | B1 | 9/2002 | Plunkett et al. |
| 6,520,134 | B1 | 2/2003 | Plunkett et al. |

* cited by examiner

*Primary Examiner* — John C Hong
(74) *Attorney, Agent, or Firm* — Gifford, Krass, Sprinkle, Anderson & Citkowski, P.C.

(57) ABSTRACT

A connection assembly for attaching metallic and plastic components by a heat staking operation includes a first component, a second component, a compressible protrusion, an annular collar, and a deformable stud. The first component is formed of a metallic material and includes an inner surface. The second component includes an interior surface facing the inner surface of the first component and an opposite exterior surface. The second component includes a plurality of apertures which extend between the interior surface and the exterior surface. During the heat staking operation the deformable stud is deformed so as to restrain relative movement between the first and second components. The compressible protrusion plastically deforms to absorb pressure to prevent cracking of the second component and the annular collar absorbs heat to prevent the second component adjacent the aperture from melting.

20 Claims, 6 Drawing Sheets

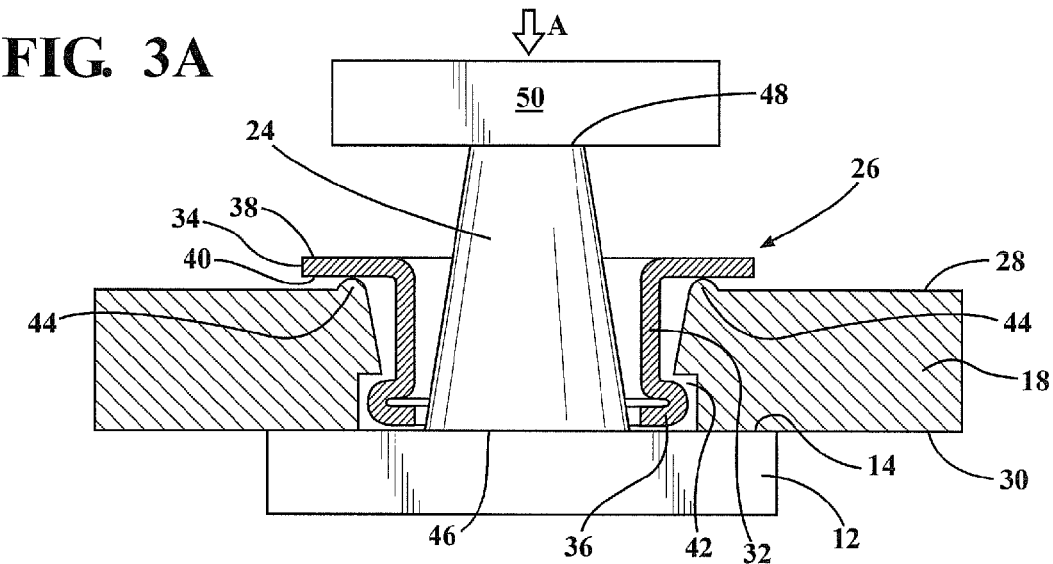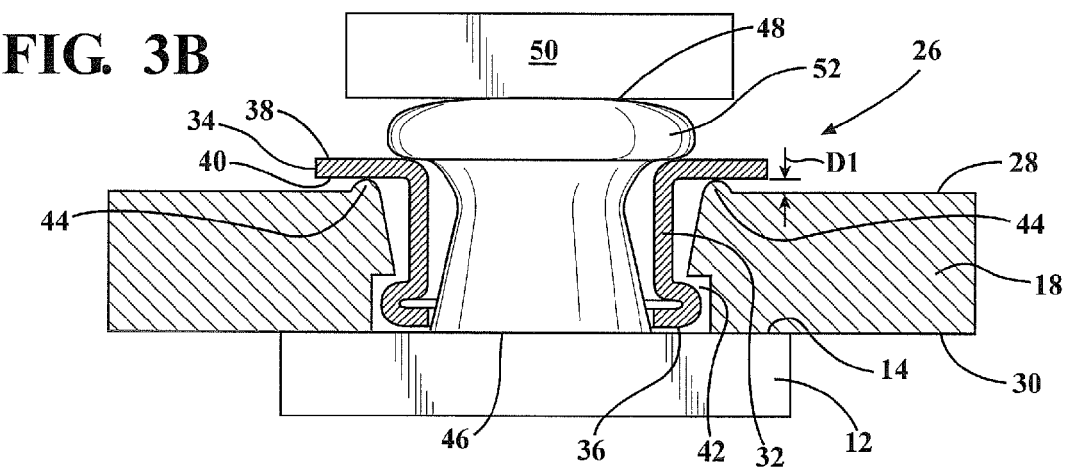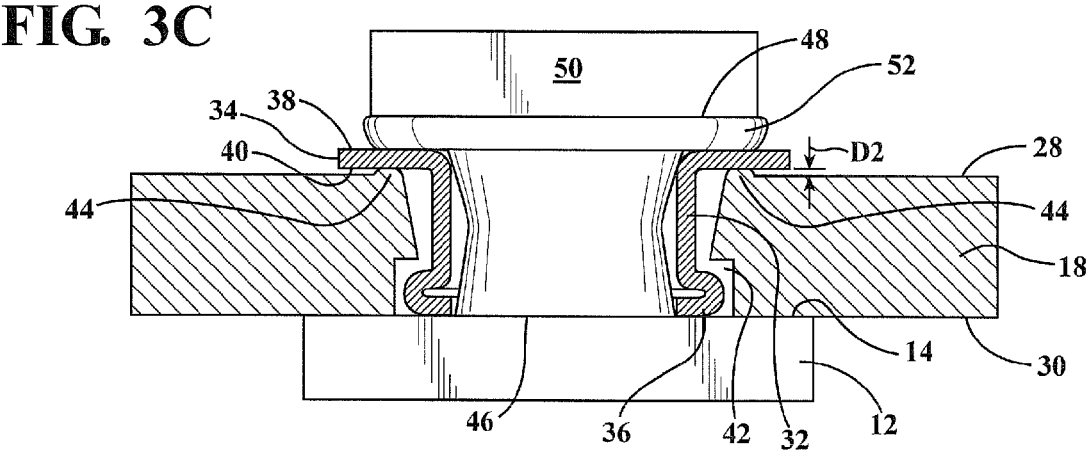

CONNECTION ASSEMBLY FOR CONNECTING METALLIC AND PLASTIC COMPONENTS AND METHOD OF CONNECTING PLASTIC AND METALLIC COMPONENTS

FIELD OF THE INVENTION

The present invention relates to a connection assembly for connecting plastic and metallic components together. More particularly, the present invention relates to the attachment of a plastic camshaft oil delivery system to a metallic cylinder head cover through a heat stake operation which prevents local cracking and melting of the plastic component.

BACKGROUND OF THE INVENTION

Internal combustion engines are typically provided with an oil shower delivery system used to spray lubrication oil on the lobes of a camshaft of the internal combustion engine. The previously known oil shower delivery systems are formed of a steel shower pipe that is attached to a steel baffle plate. The oil shower delivery system is then attached to the cylinder head cover of the internal combustion engine.

A particular disadvantage of the previously known oil shower delivery systems is the formation of the oil shower pipe and the baffle plate from steel which increases the overall weight of the internal combustion engine. During the attachment of the oil shower delivery system to the cylinder head cover, a heat staking operation is used in which heat and pressure are used to deform a deformable stud to secure the oil shower delivery system to the cylinder head cover.

In an effort to reduce the overall weight of an internal combustion engine, it is advantageous to form the oil shower delivery system from injected molded plastic components. However, due to the intense heat and pressure required during the heat staking operation, the baffle plate of the oil shower delivery system is unable to cope with the stresses and is damaged. Specifically, the pressure forms local cracks and the heat causes portions of the oil shower delivery system adjacent the mounting holes to melt. The damage caused by the heat and pressure of the heat staking process degrades the life expectancy of the connection of the oil shower delivery system to the cylinder head cover to an unacceptable level.

Thus, there exists a need for an improved connection assembly for the connection of a plastic oil shower delivery system to a metallic cylinder head cover which prevents the heat and pressure from the heat staking operation from damaging the oil shower delivery system.

SUMMARY OF THE INVENTION

The present invention provides an improved connection assembly which overcomes the above mentioned disadvantages of the previously known connection assemblies for attaching a metallic component to a plastic component.

In brief, a connection assembly for attaching a metallic component and a plastic component by heat staking a deformable stud includes a first component, a second component, a compressible protrusion, and a hollow annular collar. The first component is formed of a metallic material and includes an inner surface. The second component includes an interior surface facing the inner surface of the first component and an opposite exterior surface. The second component includes an aperture which extends between the exterior surface and the interior surface. A compressible protrusion extends outwardly from the exterior surface of the second component adjacent the aperture. The hollow annular collar has a radially extending flange at a first end. The annular collar is positioned within the aperture such that the flange covers said compressible protrusion on the exterior surface of the second component. The deformable stud is positioned within the hollow annular collar.

During the heat staking operation, heat and pressure are applied to the deformable stud. The deformable stud deforms such that the distal end bonds with the inner surface of the first component and the proximate end deforms to restrain relative movement between the first component and the second component. The compressible protrusion plastically deforms to absorb pressure to prevent cracking of the second component and the annular collar absorbs heat to prevent melting of the second component adjacent the aperture.

In one configuration, the compressible protrusion includes a plurality of compressible protrusions extending outwardly from the exterior surface of the second component adjacent the aperture. The plurality of compressible protrusions includes a first portion and a second portion. The first portion of the plurality of compressible protrusions has a first shape and the second portion of the plurality of compressible protrusions has a second shape different from the first shape.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which:

FIGS. 3A-3C are cross-sectional views of the connection assembly illustrating the deformation of the deformable stud during the heat staking operation;

DETAILED DESCRIPTION OF THE INVENTION

The present invention has utility as a connection assembly that provides a secure connection of a metallic component to a plastic component using a heat staking operation and which prevents melting and cracking of the plastic component. The connection assembly allows the oil shower delivery system to be formed of injected molded plastic components which can be fixedly secured to the aluminum cylinder head cover; thereby, reducing the overall weight of the oil shower delivery system and the internal combustion engine.

Figure 1:
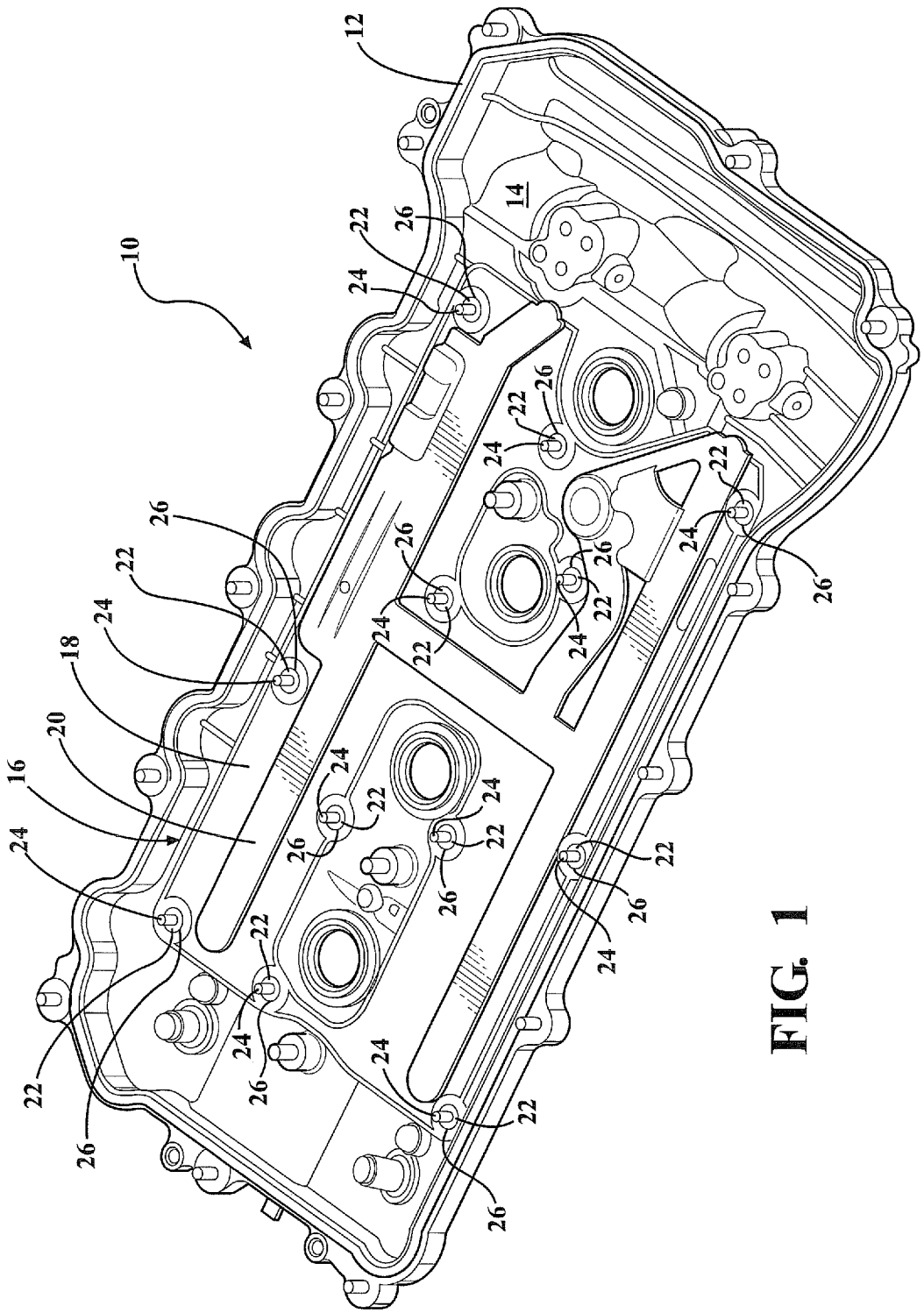
FIG. 1 is a perspective view illustrating the inventive connection assembly.
Figure 2:
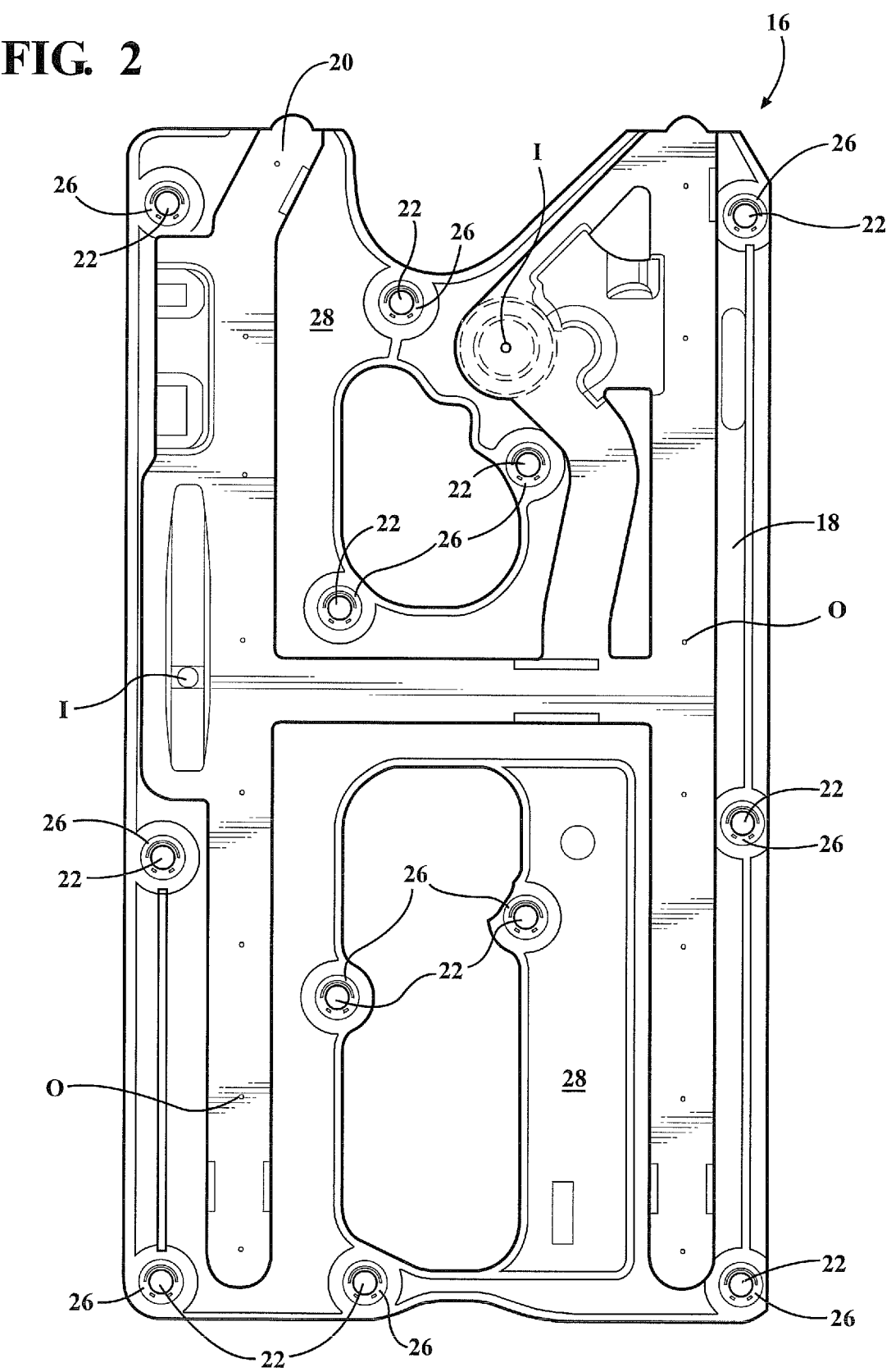
FIG. 2 is a plan view of the plastic oil shower delivery system.

With reference to FIGS. 1 and 2, a connection assembly for connecting a metallic component to a plastic component is generally illustrated at 10. The connection assembly 10 includes a cylinder head cover 12 of an automotive engine and an oil shower delivery system 16. The cylinder head cover 12 is attached to a cylinder block (not shown) which includes a camshaft for actuating the exhaust valves and the intake valves of the automotive engine. The cylinder head cover 12 is formed of aluminum or any other suitable metallic material.

The oil shower delivery system 16 is secured to an inner surface 14 of the cylinder head cover 12. The oil shower delivery system 16 is formed of a baffle plate 18 and a shower plate 20. The baffle plate 18 and the shower plate 20 are formed of injected molded plastic materials and are fixedly secured to each other to form a fluid passage therebetween. The oil shower delivery system 16 includes at least one inlet I and at least one outlet O in fluid communication with the fluid passageway so as to allow the ingress of a lubricating liquid, such as an oil, through the inlets and dispersion of the lubricating oil onto the lobes of the camshaft through outlets O.

The baffle plate 18 includes a plurality of mounting holes or apertures 22. The mounting holes 22 extend through the baffle plate 18. In the illustrated embodiment the baffle plate 18 includes twelve apertures 22. It is appreciated, of course, that the number of apertures 22 varies with the design of the baffle plate 18 and/or the cylinder head cover 12.

A hollow annular collar 26 is inserted within each of the apertures 22. Positioned within each annular collar 26 is a deformable stud 24 which secures the oil shower delivery system 16 to the cylinder head cover 12 using a heat staking operation, as will be described in greater detail below.

With reference to FIGS. 3A-3C, the structural configuration of the apertures 22, the annular collars 26 and the deformable studs 24 will be discussed in greater detail along with the heat staking operation. The apertures 22 extend through the baffle plate 18 from an exterior surface 28 to an opposite interior surface 30. The interior surface 30 faces the inner surface 14 of the cylinder head cover 12.

The annular collars 26 include a hollow generally cylindrical portion 32 which is positioned within the apertures 22. A radially extending flange portion 34 extends from a first end of the cylindrical portion 32 and a rolled portion 36 extends from an opposite second end of the cylindrical portion 32. The flange portion 34 includes an upper surface 38 and an opposite bottom surface 40. The bottom surface 40 faces the exterior surface 28 of the baffle plate 18 when the annular collar 26 is inserted within the aperture 22. The rolled portion 36 has a generally C-shape that curves inwardly.

Each of the apertures 22 is formed having an undercut 42 adjacent the interior surface 30 of the baffle plate 18. The undercut 42 has a diameter which is greater than the diameter of the remaining portion of the apertures 22. The undercut 42 receives the rolled portion 36 of the annular collar 26 in a snap fit engagement. As the rolled portion 36 extends radially beyond the cylindrical portion 32, the engagement of the rolled portion 36 with the undercut 42 provides a snap fit engagement which prevents the annular collars 26 from dislodging from the baffle plate 18 during connection of the oil shower delivery system 16 to the cylinder head cover 12. As seen in FIGS. 3A-3C, the interior portions of the apertures 22 other than the undercut 42 have a generally inclined surface relative to the exterior surface 28 so as to facilitate the engagement of the rolled portion 32 with the undercut 42.

A compressible protrusion 44 extends outwardly from the exterior surface 28 of the baffle plate 18 adjacent the perimeter of the aperture 22. The compressible protrusion 44 is positioned on the exterior surface 28 of the baffle plate 18 such that upon insertion of the annular collar 26 within the aperture 22, the flange portion 34, specifically bottom surface 40, covers and contacts the compressible protrusion 44.

Figure 4A:
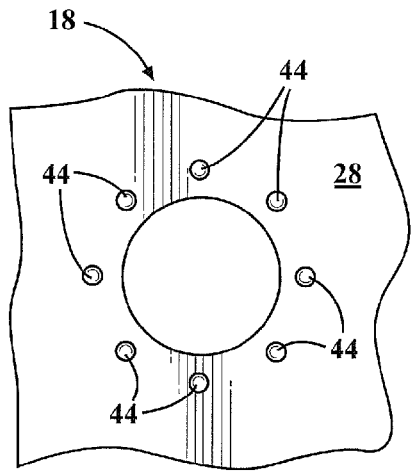
FIGS. 4A-4F are partial plan views illustrating various configurations of the compressible protrusions around the mounting holes.

With reference to FIGS. 4A-4F, various configurations of the compressible protrusions 44 are detailed. As seen in FIG. 4A, the exterior surface 28 includes a plurality of compressible protrusions 44 which are formed of a semispherical shape. The plurality of compressible protrusions 44 are provided in a discontinuous annular ring that is coaxial with the aperture 22. The plurality of compressible protrusions 44 are equally spaced around the aperture 22.

Figure 4B:
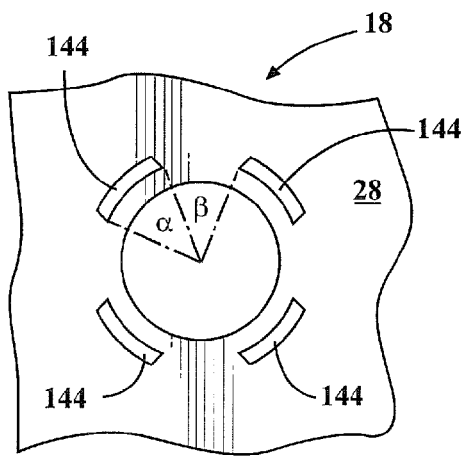

As seen in FIG. 4B, the plurality of compressible protrusions 144 extending outwardly from the exterior surface 28 of the baffle plate 18. The plurality of compressible protrusions 144 are formed as elongated semicircular segmental shapes provided in a discontinuous annular ring that is coaxial with the aperture 22. The compressible protrusions 144 are equally spaced by angle β around the aperture 22. The compressible protrusions 144 have a distance equal to angle α. In one configuration, angle α is 20 degrees and angle β is 70 degrees, and with four compressible protrusions 144 positioned coaxially with the aperture 22, the compressible protrusions 144 provide a discontinuous annular ring. It is appreciated, of course, that the spacing and length of the compressible protrusions 144 are not limited to such angles.

Figure 4C:
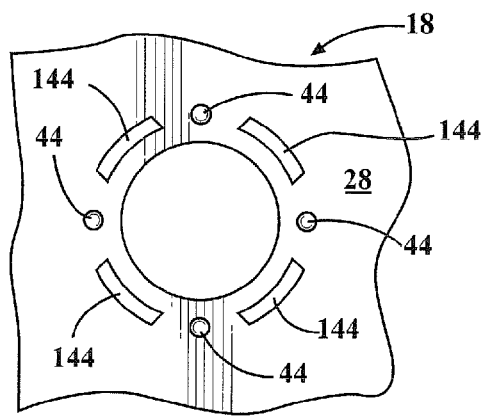

As seen in FIG. 4C, the baffle plate 18 is optionally formed having a plurality of compressible protrusions 44 having the semispherical shape and a plurality of compressible protrusions 144 having the elongated semicircular segmental shape. The plurality of compressible protrusions 44 and 144 are provided coaxial with the aperture 22. The compressible protrusions 44 and the compressible protrusions 144 are optionally provided in a discontinuous annular ring around the aperture 22 and are equally spaced around the aperture 22. It is appreciated, of course, that the configuration of the compressible protrusions 44 and 144 are not limited to a single radius around the aperture 22. Specifically, as seen in FIG. 4F, the plurality of compressible protrusions 44 form a discontinuous annular ring coaxial with the aperture 22 while the plurality of compressible protrusions 144 form a separate discontinuous annular ring coaxial with aperture 22.

Figure 4D:
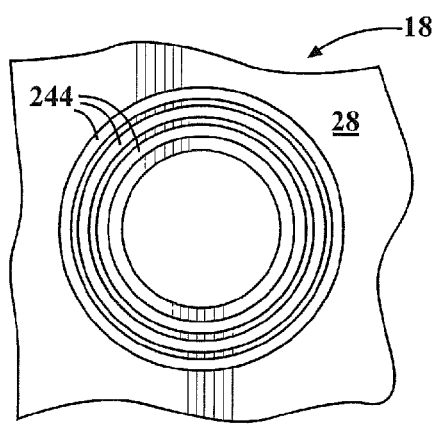
Figure 4E:
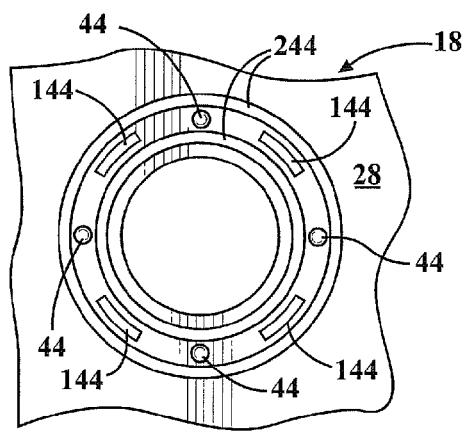
Figure 4F:
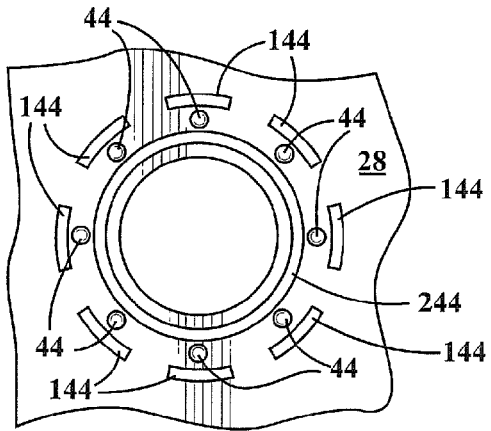
Figure 5A:
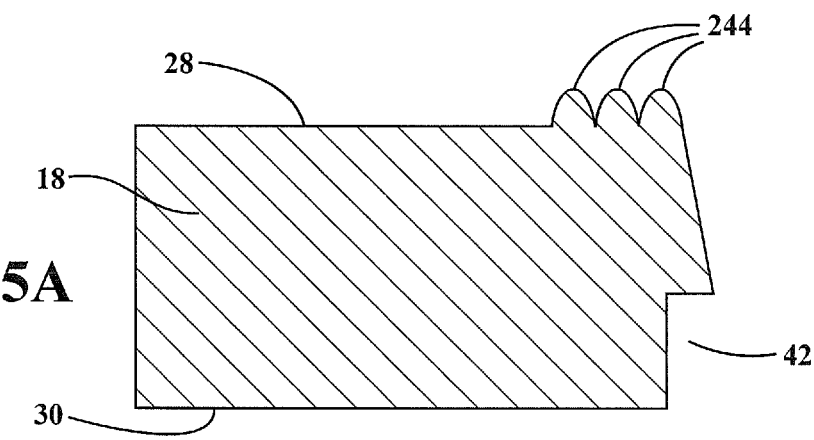
FIGS. 5A-5C are partial cross sections of the oil shower delivery system illustrating various configurations of the compressible protrusions.
Figure 5B:
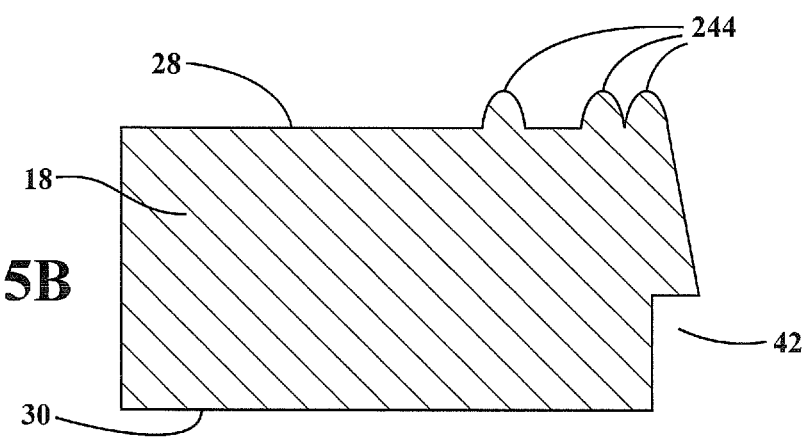

As seen in FIGS. 4D-4F, the baffle plate 18 is optionally formed having a plurality of compressible protrusions 244 extending outwardly from the exterior surface 28. The plurality of compressible protrusions 244 are formed having a shape of a continuous annular ring that is coaxial with the aperture 22. The baffle plate 18 is optionally formed with a single compressible protrusion 244 having the annular ring shape or a plurality of compressible protrusions 244 that are either equally spaced as seen in FIGS. 4D and 5A or are provided in unequal spacings around the aperture 22, as seen in FIG. 5B. The plurality of compressible protrusions 244 are provided coaxially with the aperture 22.

It is appreciated, of course, that the baffle plate 18 may optionally include a plurality of compressible protrusions having various portions that have the semispherical shape, the elongated semicircular segmental shape, and the continuous annular rings 244, as seen in FIGS. 4E and 4F.

Figure 5C:
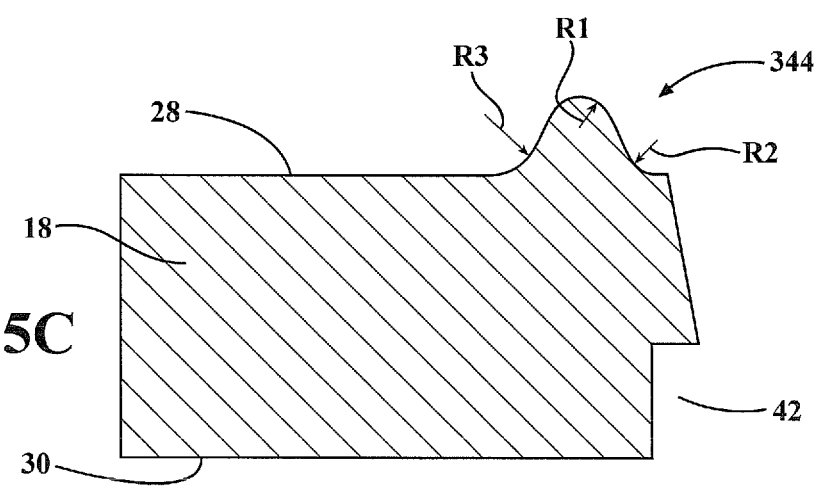

With reference to FIG. 5C, the baffle plate 18 is formed with a compressible protrusion 344 having a complex shape. The compressible protrusion 344 is formed having a complex curved relationship extending outwardly from the exterior surface 28 of the baffle plate 18. Specifically, the compressible protrusion 344 has a cross-sectional shape having a radius of curvature R1, an interior curvature between the compressible protrusion 344, and the aperture 22 is formed having a radius of curvature R2, and an exterior curvature on the exterior side of the compressible protrusion 344 having a radius of curvature R3. As seen in the illustrated embodiment, the radius of curvature R3 of the exterior curvature is larger than the radius of curvature R1 of the compressible protrusion 344. The radius of curvature R1 of the compressible protrusion 344 is larger than the radius of curvature R2 of the interior curvature. The compressible protrusion 344 is optionally formed of a semispherical shape, an elongated semicircular segmental shape, a continuous annular ring shape, or any combination thereof.

With reference to FIGS. 3A-3C and 6, the heat staking operation of the connection assembly 10 will now be discussed. During assembly of the connection assembly 10, the interior surface 30 of the baffle plate 18 is placed in contact with the inner surface 14 of the cylinder head cover 12. The annular collar 26 is inserted within the aperture 22 and the rolled portion 36 is provided in snap fit engagement with the undercut 42 to restrain the annular collar 26 with respect to the aperture 22. The deformable stud 24 is inserted within the hollow cylindrical portion 32 of the annular collar 26 such that a distal end 46 of the stud 24 contacts the inner surface 14 of the cylindrical head cover 12. An opposite proximate end 48 of the stud is provided in contact with a welding horn 50 as seen in FIG. 3A.

Figure 6:
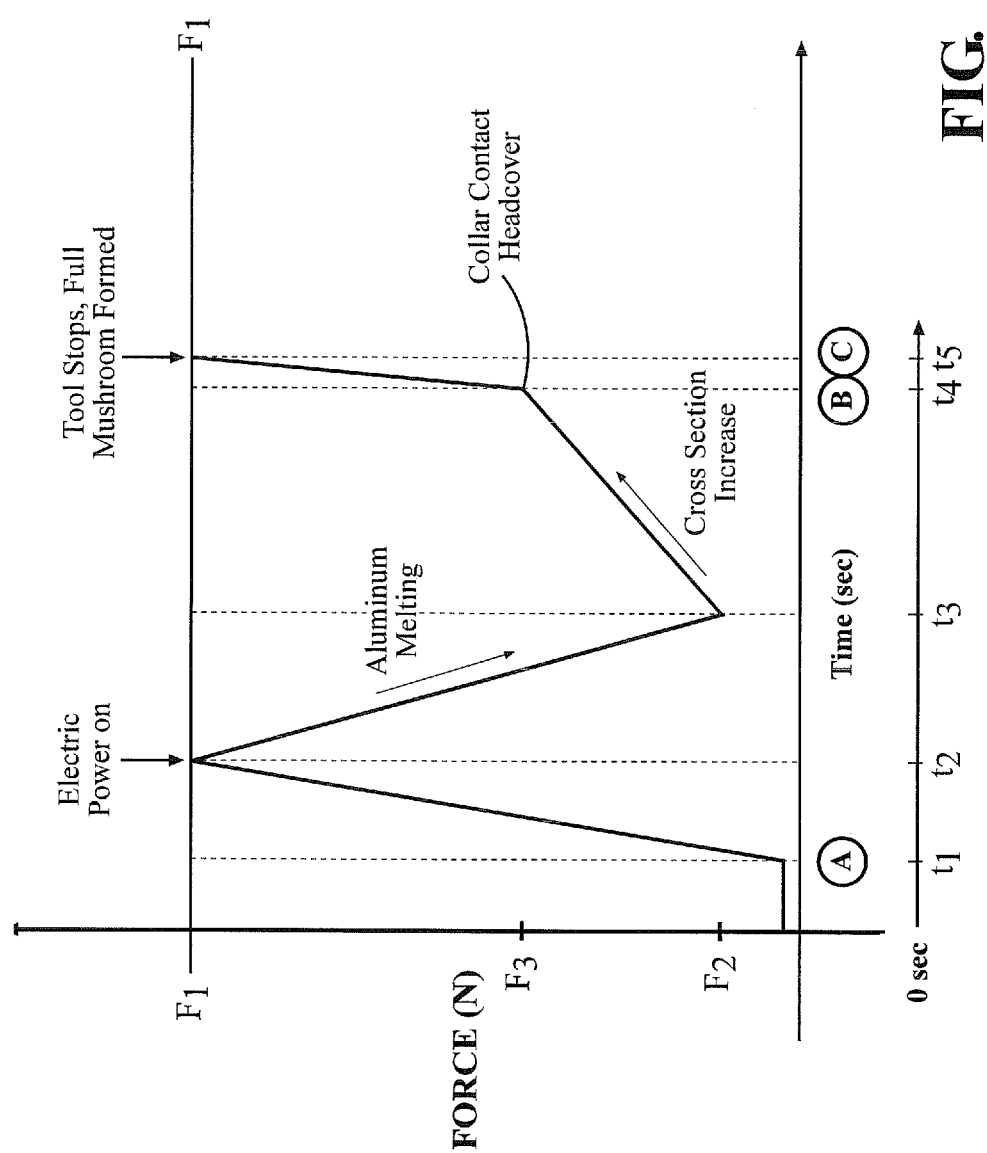
FIG. 6 is a timing chart illustrating the heat staking operation.

With reference to FIG. 6, the heat staking operation will be discussed. At time $t_1$, which is represented in FIG. 3A, the welding horn 50 is brought into contact with the proximate end 48 of the deformable stud 24. Pressure in the direction of arrow A is applied to the deformable stud 24 until at time $t_2$ the force equals a predetermined force $F_1$. The predetermined force F1 is generally equal to 4,500 newtons.

Also at time $t_2$, an electric heating element of the weld horn 50 is actuated and the pressure is decreased from $F_1$ to $F_2$ at time $t_3$. The heating element heats the deformable stud 24 adjacent the distal end 48 such that the aluminum begins to melt. The annular cover 24 prevents heat from the heating element actuated at time $t_2$ from melting the area adjacent the aperture 22 on the baffle plate 18.

At time $t_3$ the pressure is increased from $F_2$ to $F_3$ to facilitate the formation of an increased cross sectional diameter of the deformable stud 24 adjacent the proximate end 48, as best seen in FIG. 3B. During this time the distal end 46 of the deformable stud 24 is bonded with the inner surface 14 of the cylinder head cover 12.

At time $t_4$ the force is equal to $F_3$ and the rolled portion 36 of the annular collar 26 contacts the inner surface 12 of the cylinder head cover 12. The contact of the rolled portion 36 and the inner surface 14 acts as a limiter on the amount of movement of the annular collar 26 towards the inner surface 14.

The force is increased from $F_3$ at time $t_4$ to $F_1$ at time $t_5$. The increase in force flattens the area adjacent the distal end 48 of the deformable stud 24, as best seen in FIG. 3C. As the distal end 48 is melted and depressed towards the inner surface 14 of the cylinder head cover 12, the rolled portion 36 of the annular collar 26 contacts the inner surface 14 of the cylinder head cover 12. During the time from $t_4$ to $t_5$ the bottom surface 40 of the flange portion 34 is similarly being pushed by the force of the weld horn 50 towards the inner surface 14 of the cylinder head cover 12.

During the time from $t_4$ to $t_5$ the downward force of the weld horn 50 increases from $F_3$ to $F_1$. However, as the rolled portion 36 of the annular collar 26 is in contact with the inner surface 14 at time $t_4$, the increased force is used to flatten the proximate end 48 of the deformable stud 24 as seen in FIG. 3C. The portion of the deformable stud 24 adjacent the distal end 48, expands in diameter and forms mushroom 52 which has extended beyond the diameter of the aperture 22. At time $t_5$, downward force on the welding horn 50 is stopped as the mushroom 52 has fully formed and flattened; thereby, restraining relative movement of the baffle plate 18 with respect to the cylinder head cover 12. Specifically, the distal end 46 of the deformable stud 24 has bonded with the inner surface 14 of the cylinder head cover 12 to securely attach the baffle plate 18 to the cylinder head cover 12, and the mushroom 52 secures the baffle plate 18 to the cylinder head cover 12.

As the rolled portion 40 of the annular collar 26 is generally shaped having a C-shaped cross section upon contact of the rolled portion 40 with the inner surface 14 of the cylinder head cover 12, a limitation on the displacement of the annular collar 26 towards the cylinder head cover 12 can be provided. Specifically, the contact between the rolled portion 40 with the interior surface 14 of the cylinder head cover 12 provides a stop so as to limit the welding horn 50 from extending downwardly towards the cylinder head cover 12 more than a predetermined distance.

The compressible protrusion 44 plastically deforms during the heat staking operation as the bottom surface 40 of the flange portion 34 of the annular collar 26 contacts and forces against the compressible protrusion 44. The absorption of the downward force of the flange portion 34 of the annular collar 26 prevents the forces from being absorbed by the baffle plate 18 which thereby prevents micro cracks which degrade the life expectancy of the baffle plate 18. As seen in FIG. 3B, at time $t_4$ the distance between the exterior surface 28 and an upper portion of the compressible protrusion 44 is equal to D1, and at time $t_5$ the distance has compressed from D1 to D2 as seen in FIG. 3C. The increase in force from $F_3$ to $F_1$ is partially absorbed by the compression of the compressible protrusion 44 to prevent the increase in force form time $t_4$ to time $t_5$ from cracking the baffle plate 18. It is appreciated, of course, that although compressible protrusion 44 was discussed in relation to FIGS. 3A-3C and 6, each of the compressible portions 44, 144, 244, 344, or any combination thereof is applicable.

From the foregoing, it can be seen that the present invention provides a connection assembly for connecting a metallic component and a plastic component using a heat staking operation which prevents heat and force from the heat staking operation from damaging the plastic component. It is appreciated, of course, that the invention has been described in relation to a plastic baffle plate and a metallic cylinder head cover; however, the invention is not limited to such a configuration and is operable to connect any metallic component to a plastic component in the above described manner. Having described the invention herein, however, many modifications thereto will become apparent to those skilled in the art to which it pertains without deviation from the spirit of the invention as defined by the scope of the appended claims.

It is claimed:

1. A connection assembly for attaching two components by heat staking a deformable stud, said assembly comprising:
   a first component formed of a metallic material, said first component having an inner surface;
   a second component formed of a plastic material, said second component having an interior surface and an opposite exterior surface, said interior surface facing said inner surface of said first component, said second component having an aperture extending between said interior surface and said exterior surface, the second component having a compressible protrusion extending outwardly from said exterior surface adjacent said aperture; and
   a hollow annular collar having a radially extending flange at a first end, said annular collar positioned within said aperture such that a bottom surface of said flange covers said compressible protrusion.

2. The connection assembly of claim 1, wherein upon application of heat and pressure to the deformable stud, positioned within said annular collar, deforms so as to restrain relative movement of said first component and said second component, said compressible protrusion plastically deforms to absorb pressure to prevent cracking of said second component and said annular collar absorbs heat to prevent melting of said second component adjacent said aperture.

3. The connection assembly of claim 2, wherein said deformable stud and said annular collar are formed of a metallic material.

4. The connection assembly of claim 2, wherein said first component is a cylinder head cover and said second component is a baffle plate.

5. The connection assembly of claim 2, wherein said second component includes a plurality of compressible protrusions arranged around said aperture.

6. The connection assembly of claim 5, wherein said plurality of compressible protrusions are equally spaced and form a discontinuous ring that is coaxial with said aperture.

7. The connection assembly of claim 5, wherein a first portion of said plurality of compressible protrusions having a first shape and a second portion of said plurality of compressible protrusions having a second shape different from said first shape.

8. The connection assembly of claim 7, wherein one of said first portion and said second portion is positioned between said aperture and said other of first portion and said second portion.

9. The connection assembly of claim 7, wherein said first portion and said second portion of said plurality of compressible protrusions form a discontinuous annular ring that is coaxial with said aperture.

10. The connection assembly of claim 9, wherein each of said first portion of said plurality of compressible protrusions are equally spaced, and wherein each of said second portion of said plurality of compressible protrusions are equally spaced.

11. The connection assembly of claim 9, wherein a third portion of said plurality of said compressible protrusions having a third shape different from said first shape and said second shape, and wherein one of said third portion and said discontinuous annular ring formed by said first portion and said second portion is positioned between said aperture and said other of said third portion and said discontinuous annular ring formed by said first portion and said second portion.

12. The connection assembly of claim 11, wherein said third shape is a continuous annular ring that is coaxial with said aperture.

13. The connection assembly of claim 7, wherein a third portion of said plurality of compressible protrusions having a third shape different from said first shape and said second shape.

14. The connection assembly of claim 13, wherein one of said first portion, said second portion, and said third portion is positioned between the remaining two of said first portion, said second portion, and said third portion.

15. The connection assembly of claim 7, wherein said first shape is a semispherical shape.

16. The connection assembly of claim 7, wherein said second shape is an elongated semicircular segmental shape which forms a discontinuous annular ring that is coaxial with said aperture.

17. A connection assembly for attaching two components by a heat staking operation, said assembly comprising:
   a first component formed of a metallic material, said first component having an inner surface;
   a second component formed of a plastic material, said second component having an interior surface and an opposite exterior surface, said interior surface facing said inner surface of said first component, said second component having at least one aperture extending between said interior surface and said exterior surface, said second component having a compressible protrusion extending outwardly from said exterior surface adjacent said aperture;
   a hollow annular collar having a radially extending flange at a first end, said annular collar positioned within said aperture such that said flange covers said compressible protrusion; and
   a deformable stud having a proximate end and an opposite distal end, said deformable stud positioned within said annular collar, said deformable stud deforms upon the application of heat and pressure such that said distal end bonds with said inner surface of said first component and said proximate end deforms to restrain relative movement between said first component and said second component;
   wherein upon an application of heat and pressure to deform said deformable stud said compressible protrusion plastically deforms to absorb pressure to prevent cracking of said second component and said annular collar absorbs heat to prevent melting of said second component adjacent said aperture.

18. The connection assembly of claim 17, wherein said compressible protrusion has a shape selected from the group consisting of semispherical, elongated circular segment, and continuous annular ring.

19. A method of attaching two components by heat staking, said method comprising:
   providing a first component formed of a metallic material, said first component having an inner surface;
   providing a second component formed of a plastic material, said second component having an interior surface and an opposite exterior surface, said interior surface facing said inner surface of said first component, said second component having at least one aperture extending between said interior surface and said exterior surface, said second component having a compressible protrusion extending outwardly from said exterior surface adjacent said aperture;
   providing a hollow annular collar having a radially extending flange at a first end, said annular collar positioned within said aperture such that said flange covers said compressible protrusion; and
   deforming a deformable stud using heat and pressure such that a distal end of said deformable stud bonds with said inner surface of said first component and a proximate end of said deformable stud deforms to restrain relative movement between said first component and said second component;
   wherein upon an application of heat and pressure to deform said deformable stud said compressible protrusion plastically deforms to absorb pressure to prevent cracking of said second component and said annular collar absorbs heat to prevent melting of said second component adjacent said aperture.

20. The method of claim 19, wherein said compressible protrusion has a shape selected from the group consisting of semispherical, elongated circular segment, and continuous annular ring.

* * * * *